Oct. 23, 1962 C. E. WILLIAMS 3,060,426
DISPLAY APPARATUS
Filed Nov. 7, 1957 4 Sheets-Sheet 1

Cecil E. Williams
INVENTOR.
BY
ATTORNEY

Oct. 23, 1962     C. E. WILLIAMS     3,060,426
DISPLAY APPARATUS
Filed Nov. 7, 1957     4 Sheets-Sheet 2
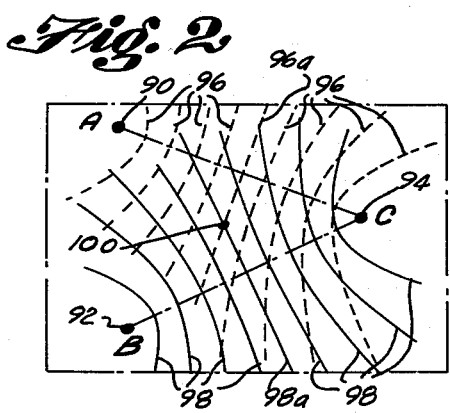
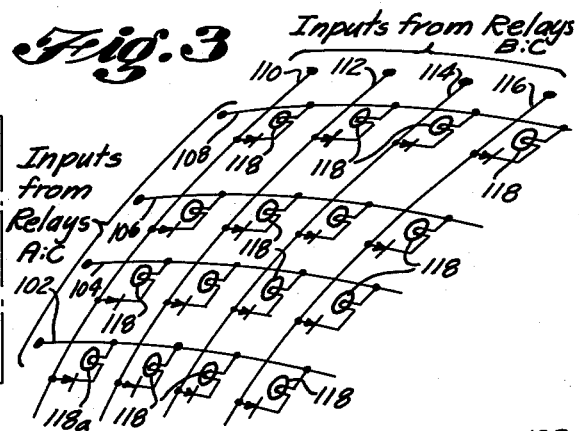
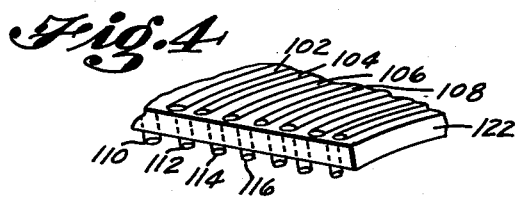
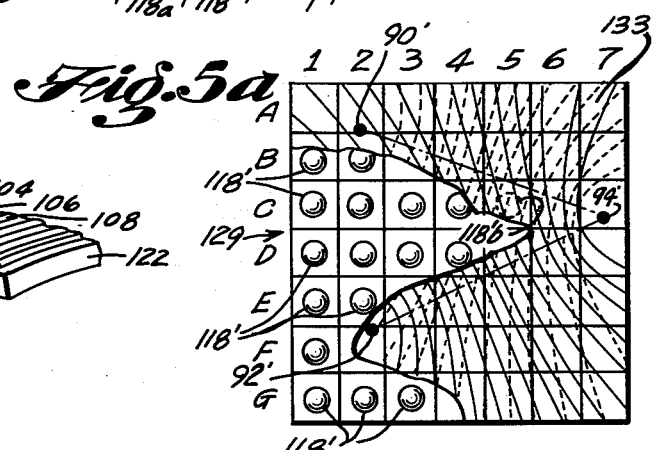
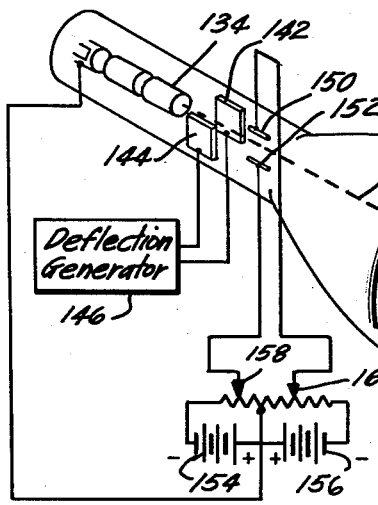
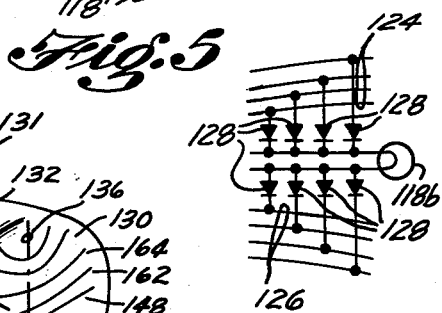
Cecil E. Williams
INVENTOR.
BY
ATTORNEY Oct. 23, 1962     C. E. WILLIAMS     3,060,426
DISPLAY APPARATUS
Filed Nov. 7, 1957     4 Sheets-Sheet 3
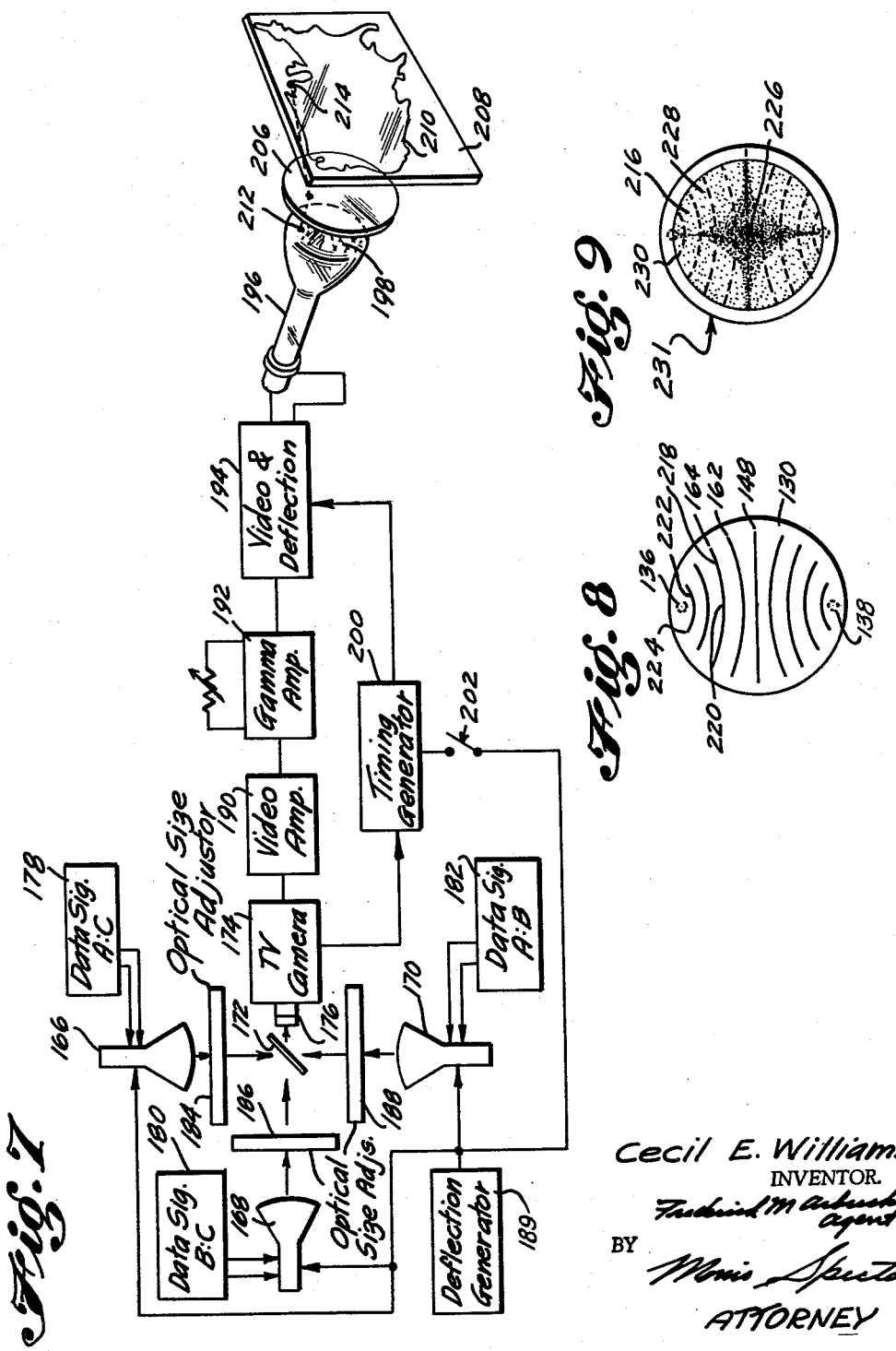
Cecil E. Williams
INVENTOR.
BY
ATTORNEY Oct. 23, 1962  C. E. WILLIAMS  3,060,426
DISPLAY APPARATUS
Filed Nov. 7, 1957  4 Sheets-Sheet 4

Cecil E. Williams
INVENTOR.
Frederick Marshall
Agent
BY
Morris Spector
ATTORNEY

United States Patent Office 3,060,426
Patented Oct. 23, 1962

3,060,426
DISPLAY APPARATUS
Cecil E. Williams, Hawthorne, Calif., assignor, by mesne assignments, to Thompson Ramo Wooldridge Inc., Cleveland, Ohio, a corporation of Ohio
Filed Nov. 7, 1957, Ser. No. 695,147
19 Claims. (Cl. 343—112)

The present invention relates to improvements in systems, techniques and apparatus for generating, producing, creating or forming image displays suitable for use in defining points of position within a given coordinate system.

More directly, the present invention relates to improvements in techniques and apparatus for transducing electrical signal information representing or defining a point of position in an area served by a given coordinate system into a visible display bearing a scaled dimensional relationship to the area in which the point of position originates and conditionally conforming said visible display to a coordinate system different from that employed in defining said point of position in the first instance.

A preferred form of the present invention provides novel means for defining a point of position in a given reference area or space stage served by a coordinate system in terms of the intersection of hyperbolic lines of position based upon pairs of fixed datuum points of position within the reference area and processing such information through the use of novel image display apparatus to generate a visible display depicting said point of position as the intersection of other hyperbolic lines of position bearing a scaled relation to the hyperbolic lines of position employed to originally define said point of position.

In many electrical communication systems it becomes desirable to represent a point of position in a given reference area on a scaled basis in a given display area. For example, in radio position finding equipment, electrical signal information is developed which defines the point of position of an aircraft or other target in terms of a coordinate system applied to a large area above or on the earth's surface or projection thereof. This area may be considered as a datum area, reference area or space stage. It has been the practice to transduce this electrical information derived from the analysis of this datum area into mathematical data which permits operating personnel to locate the position of the aircraft or other target through the use of scaled representations on maps of the area on or above which the aircraft or target location is measured. In some instances, such electrical signal position information gleaned by radio analysis is transformed into visible displays representing azimuth, distance and, even altitude of the aircraft above the earth or other reference plane. In such systems an operator must apply the information taken from such a display to a map or other coordinate system in order to usefully determine the location of the target. In air traffic control systems, for example, the requirement for operator analysis of position information and the application of such analysis to maps or other presentation display areas sometimes constitutes a cause for objectionable delay in the utilization of the position information.

The present invention seeks to overcome this problem by providing novel apparatus, techniques and systems for transducing electrical data information as to the position of the objects, targets or things over or in a reference area or datum stage into a visible display upon a presentation or display area whose dimensions bear a scaled relation to a given coordinate system. The present invention further contemplates novel apparatus, techniques and systems for making this visible display available substantially simultaneously with the collection of position data and, if desired, on a basis which provides an ultimate optical display in a given display area which is free of objectionable image intensity variations which may be associated with lines depicting the position coordinate system used as the basis for the collection of the position data. The resultant display may then take the form of a point of illumination at a position within a display area or stage bearing a scaled relation to the actual target position.

It is, therefore, an object of the present invention to provide novel apparatus for transducing electrical signal information depicting points of position within a given reference or datum area into a convenient visible display which bears a scaled relation to said reference area.

It is a further object of the present invention to provide novel apparatus for optically defining a point of position as the intersection of two lines of position.

It is another object of the present invention to provide improved means for developing a visible image defining a point of position based upon the intersection of two lines of position whereby the point of position only is made visible to the relative exclusion of those portions of the lines of position which are not in intersecting relationship to one another.

It is a further object of the present invention to provide an improved position display apparatus for analyzing and controlling air traffic in a manner providing a visible display depicting both position and altitude.

It is a further object of the present invention to provide improved display apparatus for depicting points of position based upon the intersection of hyperbolic lines of position.

It is a further object of the present invention to provide improved apparatus for generating visible images depicting predetermined lines or curves in a manner minimizing intensity variations in the brightness of said curves whereby to aid in intensity selective analysis of said images to yield data in conjunction with other images depicting similar lines and curves.

It is a further object of the present invention to provide simplified means for displaying position data derived from radio position finding techniques.

It is another object of the present invention to provide an improved display device, which may be of the cathode ray tube variety, finding utility in the position display techniques of the present invention and which provides for the generation of visible lines or traces conformed on an analog basis to individual hyperbolic lines of position falling within a given set of such lines.

It is a furher object of the present invention to provide an improved position display apparatus in which position data derived from one system of position coordinates is transduced into a visible position display representing the intersection of two or more lines of position defined in another system of coordinates.

In realizing the above objects, the present invention in one of its forms contemplates the use of novel position display means which is capable of defining, for visual inspection, one each of at least two sets of intersecting lines of position so that the intersection of these lines of position define a point of position which bears a scaled or otherwise known relation to positions or locations within a reference area of datum presentation stage. This may be accomplished, in accordance with the present invention, by means of two or more separate sets of spaced electrically conductive elements each positioned to cover, on a superimposed basis, a given display stage with each element conformed or shaped to depict one of a plurality of spaced lines of position. By selectively imposing an electrical potential on one element of each group, the point at which two elements effectively intersect may be detected and caused to actuate an annunciator in the form of a lamp, glow tube or the like. Where, in a preferred form of the invention such lines of position are made to correspond to hyperbolic lines of position based upon two or more pairs of fixed points of position in the display area, the present invention also contemplates the effective grouping of those conductors in each set which are closely spaced with respect to one another in a manner which assigns one annunciator to predetermined groups of conductive elements in each set. This reduces the number of annunciator elements required in a given display area to depict a number of possible points of position with reasonable accuracy.

In another one of its forms, the present invention contemplates the use of novel position display apparatus comprising means for presenting predetermined members of two or more sets of intersecting lines of position so that only the points of intersection of such lines of position are made visible. In creating such a display the present invention provides means for analyzing, on an intensity selective basis, a composite image resulting from the superimposition of two separate images depicting selected members of different sets of lines of position. Television scanning and display apparatus is found useful in this connection by means of providing a video signal amplitude threshold establishing means which permits the transducing of a given composite image on an intensity selective basis. Accordingly, the actual intersection of images depicting two lines of position is sensed by the television scanning system as an effective variation in the intensity of the images taken separately from one another.

In the practice of that form of the present invention in which intersecting hyperbolic lines of position are employed to define a point of position, there is contemplated the use of a novel image forming device which may take the general form of a cathode ray tube comprising a target structure subject to excitation by a deflectable electron beam to define line images on the target. Means are then provided for deflecting the electron beam along paths designated upon the target connecting two given datum points of position upon which the generation of a set of hyperbolic lines of position may be based. Means are also provided for establishing an electron beam deflection field acting upon the electron beam so conformed as to exert separately controllable forces on the beam during its deflection, the direction of the net effect of these forces being radially disposed with respect to what may be considered as two fixed points between the gun and target, these fixed points being in turn defined along lines extending through the datum points on position on the target upon which generation of the hyperbolic lines of position are based. By such means, the deflectable electron beam is caused to actually define curved images on the target which correspond to hyperbolic lines of position. Two or more such image forming means may be used in the same tube envelope or separate envelopes in a manner providing for the display of a composite image depicting two or more sets of hyperbolic lines of position in intersecting relation to one another. This composite image may, in accordance with one form of the present invention, be transduced on an intensity selective basis to form a point position display corresponding only to points of actual intersection between the lines of position.

In electron beam apparatus or the like where an image is defined on a target by the motion of a deflected beam impinging thereon, it is often found that the intensity of the image is a function of beam velocity and actual beam intensity. To correct for this effect, the present invention in one of its forms provides for modulating the intensity of the beam as a function of its velocity upon and along the target or, alternatively, where the curves or traces of the electron beam on the target correspond to a set of known mathematical curves, provision is made for a variable gradient filter through which the target image is examined. The variations in the relative opacity of various sections of the filter are established on a complementary basis to expected variations in image intensity. Moreover, in an electron beam system, where beam velocity is employed as the basis for modulating the intensity of beam current, the present invention contemplates novel means for measuring the beam velocity by imposing two separated grids between the target and electron gun each comprising a plurality of equi-spaced parallel conductors. The two grids are oriented at approximately 90 degrees with respect to one another so that the frequency of the signals produced by the electron beam while traversing each of the grids may be combined on a vectorial basis to develop a signal representing the velocity of the beam upon and along the surface of the target.

In still another form of the present invention, the point of position defined by the intersecting lines of position is, in its ultimate visible display, caused to assume a color which bears a known relation to other data associated with the target or object which the point of position represents. In air traffic control systems where the points of position provided by the present invention represent aircraft, the color of the image depicting the point of position of the aircraft (as vertically projected on the terrain beneath it) may represent the altitude of the aircraft above the earth or above some reference plane. Alternatively, the color of the image may represent the aircraft identity.

A better understanding of the present invention, as well as the above and other objects and features of advantage may be obtained from the following description, especially when taken in connection with the accompanying drawings, in which:

FIGURE 2 is a graphical presentation of how the apparatus of FIGURE 1 develops position information through the utilization of intersecting lines of position, specifically hyperbolic in nature.

FIGURE 3 is a combination diagrammatic and schematic representation of a display system suitable for generating a visible indicium of position information in response to electrical signals, for example, of the type provided by the system of FIGURE 1.

FIGURE 4 is a diagrammatic showing of how the elements depicted in FIGURE 3 are mounted in relation to one another for use in one form of a position display device.

FIGURE 5 is a diagrammatic representation of a portion of modified form of position display device of the type shown in FIGURE 3.

FIGURE 5a is a diagrammatic representation of another form of position display device employing the principles of the invention illustrated in FIGURE 5.

FIGURE 6 is a combination block and diagrammatic representation of one form of image display device which, in accordance with the present invention, provides for the generation of images conformed in shape to a predetermined set of lines of position and in particularity to lines of position representing hyperbolic curves generated about two fixed points of datum position.

FIGURE 7 is a combination block and diagrammatic representation of one form of the present invention providing for the intensity selective analysis of a composite image made up of intersecting lines of position to effectuate point position display on a map or other presentation area in a manner discriminating against the actual lines of position which define the point of position.

FIGURE 8 is a symbolic representation of the characteristics of images formed by the device of FIGURE 6.

FIGURE 9 is a symbolic representation of one version of a variable gradient filter useful in conjunction with image forming apparatus of FIGURE 6 to correct systematic and predictable changes in the intensities of various portions of images depicting predetermined curves and/or lines of position.

Figure 1:
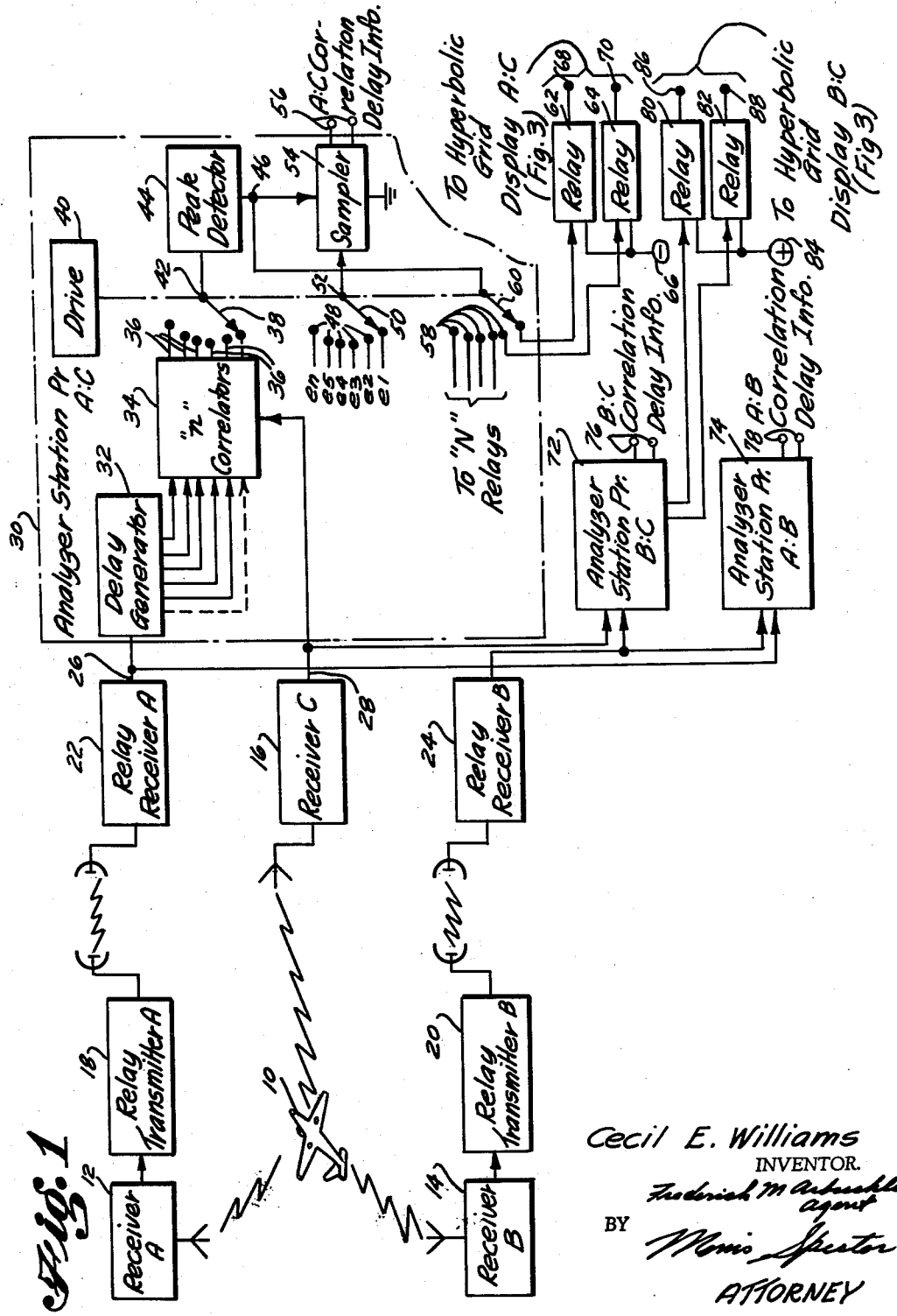
FIGURE 1 is a combination block and symbolic representation of one system suitable for generating electrical signal information representing the position of a target such as an aircraft, with respect to fixed positions on or above the surface of the earth.

Turning now to FIGURE 1, there is shown an electronic system for developing electrical signals depicting the position of an object such as an aircraft 10. The general system shown is similar to the arrangement described and claimed in Patent Number 2,940,076, issued June 7, 1960, on a copending patent application by T. B. Bissett, A. S. Fulton and W. V. Conover, entitled "Passive Position Determining System," Serial No. 640,412, filed February 15, 1957. The position of the aircraft 10 is sensed by means of radio wave propagation from the aircraft to three radio receiving stations A, B and C indicated at 12, 14 and 16, respectively. The radio receiving stations A, B and C are fixed at predetermined locations on the surface of the earth and form three pairs of stations which may be employed, as hereinafter described, to determine the differences in the time it takes signals emanating from the aircraft 10 to reach the two stations comprising each pair. To this end, receiving stations A and B, at 12 and 14 respectively, are arranged to deliver their output signals to relay transmitters A and B, at 18 and 20 respectively. The relay transmitters A and B respectively beam the signal information detected by the receivers A and B to two relay receivers A and B, shown at 22 and 24 respectively. In the particular arrangement shown, relay receivers A and B, along with radio receiving station C, are located at an analyzing center comprising three analyzer stations 30, 72 and 74 at which the signals from the three radio receiving stations A, B and C at 12, 14 and 16 respectively, are processed.

In the arrangement shown in FIGURE 1, the signals received by each pair of radio receiving stations A, B and C are analyzed to determine the difference in the time required for the signal from the aircraft 10 to reach each member of a receiver pair. For example, the output signals from relay receiver A and receiver C are applied via circuit paths 26 and 28, respectively, to an analyzer station A:C represented by the elements in dotted line area 30. Purely by way of example, elements of a signal correlation system are shown within the dotted line area 30 as constituting means for measuring the time difference between the signals delivered to the analyzer station. The signal correlation system itself comprises a delay generator 32 and a plurality of signal correlators 34 which are "$n$" in number, one signal correlator being assigned for each value of correlation delay provided by the delay generator 32. At the output terminals 36 of the correlators 34 will appear corresponding electrical potentials representing the value of the correlation function between the two signals delivered by relay receiving station A and receiving station C for various values of correlation delay provided by the delay generator 32. As is well known in the art of signal correlation, the value of the correlation function will be maximum (in a given polarity direction) when the delay provided by the delay generator 32 is such to produce time coincidence between the signal from receiver C and the delayed version of the signal delivered by the relay receiver A. The signal potentials appearing at terminals 36 may then be electrically scanned on a sequential basis by means of a commutator arm 38 in accordance with the teachings of copending U.S. patent application Serial No. 688,468, entitled "Signal Analyzing Apparatus," by Neal S. Anderson, Julius S. Bendat and Cecil E. Williams, filed October 7, 1957. The commutator arm 38 is actuated by a drive mechanism 40 and the output of the commutator, as made available at terminal 42, is applied to a peak detector 44. As shown in the last-mentioned copending patent application, it is the function of the peak detector 44 to deliver an output signal at terminal 46 at a time during the scanning interval of the commutator arm 38, when the maximum value of correlation signal is commutated. A plurality of electrical potentials, each of a discrete and different value, are applied to terminals 48 of a companion commutator having a commutating arm 50 driven in synchronism with the commutator arm 38 by the drive mechanism 40. The potentials applied to terminals 48 have been designated as $e_1$ through $e_n$ and, in one form of analyzing action, the potentials $e_1$ through $e_n$ may represent stepped variations in electrical potential with the increment between any two adjacent potentials being a fixed amount. The potentials sampled by the commutator arm 50 are applied to output terminal 52 which is in turn connected to the input circuit of a sampler 54. The sampler 54 is arranged to deliver to its output terminals 56 a signal representing the value of stepped potential applied to its input circuit at the time the signal delivered by the peak detector 44 actuates the sampler. The potential which is consequently delivered to the output terminals 56 of the sampler 54 will, therefore, represent the value of correlation delay for which the maximum value of correlation function is produced. Since the distances between receiving stations A, B and C at 12, 14 and 16 respectively are known, the value of potential at terminals 56 may be directly equated to the difference between the time at which signals from the aircraft 10 are actually received by the radio receiving stations 12 and 16. The potential appearing at terminals 56 has, therefore, been assigned the legend A:C correlation delay information and bears a direct relationship to time difference information relative to the arrival of signals at the two radio receiving stations A and C at 12 and 16 respectively.

Further considering the analyzer station for radio receiving station pair A:C in FIGURE 1, a third commutator is provided having commutation terminals 58 and a commutation arm 60 also driven by the drive mechanism 40. The purpose of this last commutator is to provide means for routing the peak indicating signal delivered by the peak detector 44 to one of a plurality of electrical relays (which may be "$n$" in number), only two of which are represented at 62 and 64 respectively. As will be more fully understood in connection with the illustrations of FIGURE 2 and FIGURE 3, the relays 62 and 64 act, by way of example, to apply a negative potential available at terminal 66 to individual members of a hyperbolic grid display specifically shown in FIGURE 3 in order to assist in the effectuation of a position display bearing a scaled relation to the terrain over which the aircraft 10 is flying at the time position information is developed. The negative potential available at terminal 66 will, therefore, be conditionally available at the output terminals of the various relays such as terminals 68 and 70 of relays 62 and 64, respectively.

It can, therefore, be seen in the arrangement of FIGURE 1 that analyzer station A:C provides two forms of electrical signal information depicting the time difference between signals arriving at receiving stations A and C shown at 12 and 16, respectively. The first of these position indicating signals is made available as correlation delay information at output terminals 56 of sampler 54. The second of these signals is made available at the output terminals of relays connected with the commutator terminals 58. Both of these time difference representing signals may be thought of as position indicating signals for the purpose of this specification, inasmuch as these signals may, as will later be seen, through the use of the novel apparatus provided by the present invention, be employed to effect point position display on a display target. The analyzer station A:C has counterparts shown at 72 and 74, respectively. These analyzer stations respectively analyze signals received by radio receiving stations B:C and radio receiving stations A:B. Position indicating signals developed by analyzer station B:C at 72 are made available at output terminals 76 while corresponding signal information relative to radio receiving stations A and B is made available at terminals 78. Analyzer station 72 is also shown to have associated with its output a plurality of relays two of which are, by way of example, shown at 80 and 82 respectively. Relays 80 and 82, for example, may be arranged to conditionally apply a positive potential, available at terminal 84, to one of a plurality of output terminals such as 86 and 88 associated with relays 80 and 82. As will be more fully apparent as the specification proceeds, the output potentials delivered by the relays are applied to corresponding members of another hyperbolic grid display of the form shown in FIGURE 3.

Turning now to FIGURE 2, the mode of operation of the passive position determining system shown in FIGURE 1 will be more clearly apparent. Here, the positions of radio receiving stations A, B and C (shown at 12, 14 and 16 in FIGURE 1) are graphically depicted to scale at points 90, 92 and 94 of FIGURE 2. For illustrational simplicity, only two pairs of stations, namely, station pair A:C and station pair B:C, will be considered. As shown in FIGURE 2, the positions of stations A and C at 90 and 94, respectively, may be considered as datum positions or reference positions which form the basis of a plurality of hyperbolic lines of position shown by the dotted lines 96. Each of these hyperbolic lines of position represent the locus of points between the stations A and C, the difference in the distances between each point on the locus and the two stations, being a given constant value. For example, the hyperbola 96a, constituting a straight line, represents the locus of points the difference in the distances of which from the two stations A and C is zero. This means that radio signals transmitted omnidirectionally from any position depicted by points along the hyperbola 96a will reach the two stations A and C simultaneously. Hyperbolas to the left of the line 96a (in the drawing) and closer to station A progressively depict increasing values of given values of time difference (or distance difference) in an arbitrarily positive going sense, while hyperbolas extending to the right of hyperbola 96a and continuing to station C represent increasing values of time difference (or distance difference) in an arbitrarily negative going sense.

Also, in reference to FIGURE 2, station pair B:C have associated with them a family or set of hyperbolas representing different discrete time differences or "distance-differences" relative to the arrival of radio signals at receiver stations B and C. These hyperbolas are shown by solid lines 98, with the hyperbola 98a representing the line of zero time delay or zero distance difference. Each set of hyperbolas may, therefore, be considered as a set of lines of position with the intersection of any one member of one set with the intersection of any one member of the other set precisely locating a point of position. In the example being considered, these lines of position may be considered as being based upon a hyperbolic coordinate system. By way of example, the intersection of the hyperbolic line of position 96a with the intersection of the hyperbolic line of position 98a defines a point of position 100. If the positions of receiver stations A, B, C at 12, 14 and 16 respectively in FIGURE 1 form an equilateral triangle, the point of position 100 may be associated with an aircraft whose distances from each of receiver stations A, B and C are the same. Since the voltage signal delivered at the output of the samplers in each analyzer station also represents or may be related to a given hyperbolic line of position, it will be seen that all of the signal potentials delivered at the output terminals of analyzer stations 30, 72 and 74, i.e., terminals 56, 76 and 78 as well as actuating potentials for the relays such as 62, 64, 80, 82 each correspond to a particular member of different sets of hyperbolic lines of position, the intersections of these lines of position yielding point position information.

In accordance with the present invention, position information yielded by the analyzer stations 30, 72 and 74 in FIGURE 1 may be uniquely displayed by means of a novel display device comprising superimposed wire grids, the members of each grid being conformed in shape to selected members of hyperbolic lines of position within a set of such lines of position. Thus, as shown in FIGURE 3, elements 102, 104, 106 and 108 comprise spaced electrical conductors insulated from one another and each conformed to a hyperbolic line of position in a manner depicted by FIGURE 2. For illustrational convenience, only two grids or separate sets of conductors have been shown in FIGURE 3, it being understood that a third grid may be employed, as will be understood as the description proceeds. The second grid of FIGURE 3 comprises electrical conductor elements 110, 112, 114 and 116. Each of these conductors is also conformed to a selected hyperbolic line of position of the nature shown in FIGURE 2. By way of example, the grid comprising elements 102 through 108 has been oriented with respect to the grid having elements 110 through 116 in conformity with the hyperbolic lines of position based upon station pairs A:C and B:C shown in FIGURE 2. It will be understood that FIGURE 3 represents a rather magnified view of a small section of the area depicted by the hyperbolic lines of position in FIGURE 2. The curvature of the grid elements in FIGURE 3, therefore, does not appear as pronounced as some members of the sets of hyperbolic lines of position shown in FIGURE 2. This has been done for the sake of illustrational clarity.

In order to produce visible displays or indicia representing points of position, the present invention contemplates the use of annunciator devices indicated at positions 118 adapted to be electrically excited in response to a difference in potential between the conductive elements to which they are attached. The annunciator devices may take the form of tungsten lamps, gas discharge lamps or other means for producing a visible indication upon actuation or excitation. Each of the annunciator devices 118 is connected between one conductive element in one grid and one other conductive element in another grid through a unilateral conduction device indicated in FIGURE 3 through the use of a rectifier symbol. The unilateral conduction device in series with each annunciator device prevents the actuation of the annunciator device in response to potential differences between other than the two grid conductors to which they are immediately connected. In other words, the unilateral conduction devices prevent a form of display cross talk.

Referring now to FIGURES 1 and 3 together, it can be seen that the grid elements 102 through 108, respectively, are connected to relays operated by the A:C analyzer such as relays 62 and 64. Specifically, relay output terminals 68 and 70 may be considered as being connected to conductors 102 and 104 of FIGURE 3. Similarly, conductive elements 110 through 116 are connected to relays operated by the station pair B:C analyzer 72 and, by way of example, relay output terminals 86 and 88 may be considered respectively connected to conductors 110 and 112 in FIGURE 3. Thus, if as a result result of time delay measurements made by the apparatus of FIGURE 1, conductor 102 has applied to it a negative potential (by virtue of the actuation of relay 62 in FIGURE 1), and conductor 110 has applied to it a positive potential (by virtue of the actuation of relay 80 in FIGURE 1), the annunciator device 118a will become actuated and all other annunciator devices will remain unactuated.

The two separate sets of conductors comprising the grids for accepting station A:C information and B:C information in FIGURE 3 may be mounted, as shown in FIGURE 4, on a transparent insulating base 122. Thus, conductors 102, 104, 106 and 108 may appear on the upper surface of the base 122 while conductors 110, 112, 114 and 116 may appear on the lower surface of the base 122. The annunciator devices 118 and associated unilateral conduction devices may be suitably soldered, welded or crimped to the conductors held by the insulating base 122 through the agency of holes (not shown) through the insulating base. The composite hyperbolic grid assembly fixed to the insulating base 122 may then be superimposed over a scaled map of the terrain over which the aircraft 10 in FIGURE 1 is passing. The actuation of the annunciator devices will, therefore, depict the relative location of the aircraft during its flight. It is contemplated that the radio energy transmitted from the aircraft 10 may either be periodically transmitted for the purpose of traffic control or intermittently transmitted in the course of routine voice checks with a ground location. The identity and altitude of the aircraft may be determined in a variety of ways, i.e., a unique coding of the signal transmitted by the aircraft, the particular frequency of an oscillator or other signal source which modulates the radio carrier transmitted by the aircraft, or simple audible analysis of voice messages transmitted by the aircraft.

In order to minimize the number of annunciator devices necessary in covering a large map or terrain representation, advantage may be taken of the fact that near the receiving station locations there will be tendency of the superimposed intersecting lines of position to crowd so that the number of line crossings per unit area in the location of the receiving station will be generally higher than other areas of the terrain. The arrangement depicted in FIGURE 5, in accordance with the present invention, therefore provides for a single annunciator 118b serving a plurality of elements such as 124 in one grid and a plurality of grid elements 126 in another grid. Unilateral conduction devices 128 now connected on each side of the annunciator 118b provide for the actuation of the annunciator device 118b whenever a potential difference exists between any one of the conductors 124 and any one of the conductors 126. Furthermore, since the lines of position depicted by the conductors 124 and 126 are in high density crossing areas of the terrain or map depicting the terrain, the relative accuracy of point position delineation will, through the use of this particular feature of the present invention, not be greatly reduced.

This latter feature of the present invention is perhaps more clearly understood through reference to FIGURE 5a of the drawings which depicts one form of a rectangular coordinate display device 129 based upon an arrangement of lamps or annunciators 118' which themselves may be of the same character as lamps 118 described in connection with FIGURE 3. By way of example, the lamps 118' have been shown as 49 in number and are arranged in seven vertical rows with seven lamps in each row. A translucent overlay 133 comprising a scaled map of an area such as depicted in FIGURE 2 may be placed over the display device 129 so that each of the lamps 118', upon electrical actuation, will depict an illuminated point of position on the overlay. FIGURE 5a shows a portion of the overlay 133 cut away so that only a few of the lamps 118' are exposed to direct view. The overlay 133 has depicted thereon two sets or families of hyperbolic lines of position, one set being shown by dotted lines, the other set being shown by solid lines. The dotted line set may be considered to generally correspond to lines 96 of FIGURE 2 while the solid line set may be considered to generally correspond to lines 98 of FIGURE 2. The datum points of position 90, 92 and 94 in FIGURE 2 have also been indicated on the overlay of FIGURE 5a at 90', 92' and 94'. Thus, the overlay is effectively "broken-up" into 49 elemental areas of position, such as the areas A–1 through A–7, B–1 through B–7, C–1 through C–7 . . . G–1 through G–7. Elemental area C–5 can, by way of example, be seen to have a greater density of hyperbolic line crossings than area G–7. Thus, the single lamp 118'b (shown in dotted lines as serving the elemental area C–5) upon actuation or excitation will represent some one of a plurality of points of position within elemental area C–5. Lamp 118'b can, therefore, in accordance with the present invention be connected to a number of pairs of the relays such as 62, 64, 80 and 82 of FIGURE 1, through unilateral conduction devices in the manner generally illustrated in FIGURE 5 where each of the conductors 124 and 126 is connected to a different relay operated as shown in FIGURE 1.

Actually, the display device of FIGURE 5a constitutes a novel means for transducing position data based upon hyperbolic lines of position into point position display based upon a rectangular coordinate system. When the lamp arrangement shown in FIGURE 5a is employed, it is no necessary to provide special grids of the type shown in FIGURE 3 in which each of the conductive elements comprising the grids are shaped or conformed to a hyperbolic line of position. For example, in FIGURE 3, lamp 118a is excited by a potential difference existing between conductive elements 102 and 110 of the grids shown. Thus, it is only necessary, in connecting the lamps 118' of FIGURE 5a, to determine which elemental areas of FIGURE 5a are common to the two hyperbolic lines of positions which the conductors 102 and 110 in FIGURE 3 are shaped to represent. For example, it may be found that if the hyperbolic lines of position to which the conductors of the grids shown in FIGURE 3 are conformed, are represented on the overlay 133 of FIGURE 5a, the hyperbolas corresponding to conductors 102 and 110 of FIGURE 3 will intersect only in one elemental area such as, for example, F–2 of FIGURE 5a. Thus, the lamp serving the elemental area F–2 in FIGURE 5a will be connected through a unilateral conduction device to terminals 68 and 86 of the relays 62 and 80 in FIGURE 1, which is the electrical equivalent of the connection of lamp 118a in FIGURE 3 to the conductors 102 and 110. Likewise, the lamp serving elemental area C–5 of FIGURE 5a may be likened unto lamp 118b of FIGURE 5 so that the lamp in elemental area C–5 indicated at 118'b will find itself connected through pairs of unilateral conduction devices to a plurality of relay terminals such as 68, 70, 86 and 88 of FIGURE 1. The arrangement of FIGURE 5a, therefore, comprises a simple, effective, and inexpensive means for transducing position information based upon intersecting hyperbolic lines of position having relatively high definition or accuracy into visual indicia depicting points of position within a rectangular coordinate system with relatively lower definition or accuracy.

It will be understood that, in order for a display device constructed in accordance with the teachings of FIGURES 3 through 5 to afford a position display facility having accuracy equal to the capacity of the position developing signal system of FIGURE 1, the number of conductive elements comprising each of the grids shown in FIGURE 3 would have to be equal to the number of discrete voltages $e_1$ through $e_n$ (FIGURE 1) presented to the sampler 54 for sampling. However, the position signal developing system of FIGURE 1 is only one example of means for developing information signals depicting points of position in terms of intersecting lines of position. If the system of FIGURE 1 were replaced with a system providing a position information signal capable of depicting lines of position on an analog basis rather than discrete steps of potential, the number of conductive elements in each of the grids shown in FIGURE 3 would have to approximate an infinite value in order to take advantage of all of the position information available. In such cases where it is desired to display position information on an analog basis, or on a basis employing a large number of discrete possible lines of position, the present invention contemplates the provision of a display device capable of generating a virtually infinite number of lines of position. Such a display device, in accordance with the present invention, may be modified to simultaneously produce two or more sets of intersecting lines of position bearing a scaled relation to a given terrain or area projected on a reference plane. In this more general form such a device, according to the present invention, employs a beam responsive target toward which is directed a deflectable beam for defining on the target an image of the path of the beam upon and along the surface of the target during its deflection. Two points of datum position are defined on said target and means provided for nominally deflecting the beam in a direction transverse to a line connecting the two datum points of position. By additionally imposing a deflection force on the beam during its transverse deflection, which is radially directed to one or the other of said fixed points of position, the trace of the beam on the target may be conformed to a variety of mathematical curves such as hyperbolas. Display apparatus constructed in accordance with this principle permits the development of a continuous set of mathematical curves such as hyperbolas representing loci of points, the difference in distances from any point (along a given locus) to the two fixed datum points of position being a constant.

A convenient way of developing a continuous set of mathematical curves in accordance with this aspect of the present invention is shown in FIGURE 6. Here, an electron beam responsive target 130 is acted upon by a deflectable electron beam 132 generated by electron gun 134. Two points of datum position on the target 130 are shown at 136 and 138. These two points need not, of course, be visibly defined on the surface of the target 130 but are indicated in the drawing merely to illustrate the principles of operation involved in this embodiment of the present invention. A line 140 connecting the two points of datum position is also shown purely for descriptive purposes. Means are then provided for deflecting the electron beam 132 along paths transverse to the line 140. Such means may take the form of the electrostatic deflection plates shown at 142 and 144, having applied across them a suitable deflection voltage developed by a deflection generator 146. In a preferred form of the present invention, the waveform of the deflection voltage is sawtooth in character. Thus, without any further deflection influence on the beam 132, the image produced on the target 130 would be substantially a straight line, as indicated at 148. However, in accordance with the present invention, additional forces are imposed upon the beam during its transverse deflection, these forces being radially directed toward one or the other of the points of datum position 136 or 138 or, more accurately, radially directed with respect to points along lines passing through these points of datum position and extending in the direction of the electron gun 134. These constructional lines have not been shown. One means for producing these radial forces is shown in FIGURE 6 as comprising two line-type electrodes 150 and 152. It is the purpose of these line-type electrodes to establish two separate electrostatic fields radially disposed with respect to the longitudinal axes of the conductors. In essence, the fields produced by the line electrodes correspond to the theoretical electrostatic field surrounding a line charge in space. In order to approximate this theoretical electrostatic field pattern, the diameter or transverse dimension of the electrodes 150 and 152 should be extremely small with respect to their spacing and, in practice, extremely small with respect to the maximum dimensions of either of the electrodes 142 and 144. The electrodes 150 and 152 are, in one form of the invention, established at a negative potential with respect to the gun 134 by means of potential sources 154 and 156. The value of potential applied to each line electrode may be controlled by any suitable means such as the potentiometers 158 and 160 or the potential sources 154 and 156 may be substituted by data signal sources such as the samplers, such as 54, in analyzer stations shown in FIGURE 1.

In understanding the operation of the display device shown in FIGURE 6, it will be recognized that if each of the line electrodes 150 and 152 is established at a negative potential with respect to the electron gun 134, the electron beam 132 during its transverse deflection action along lines perpendicular to the constructional line 140, will be repelled by the field surrounding each line electrode. If the potentials of the two line electrodes 150 and 152 are equal with respect to the electron gun 134, the net force on the electron beam 132 during its transverse deflection will be zero at all points and hence the trace thereof on the target 130 will conform to the straight line 148. If, however, the potential on electrode 150 is less negative than the potential on electrode 152, the electron beam, during its transverse deflection, will experience a net force essentially radially directed to the point corresponding to the datum position 136. The trace of the electron beam on the target 130 will then produce an image similar to that represented by line 162 lying above line 148 in the figure. By further increasing the difference in potential between the two line electrodes, in the same direction, a trace such as represented by line 164 will be produced. A study of the field distribution around the two line electrodes 150 and 152 reveals that the curved traces produced on the target 130 correspond to a family of hyperbolas, provided the deflection produced by electrodes 142 and 144 is linear with respect to time. An analogous set of traces, of course, will be defined below the line 148 by making the potential on electrode 152 less negative than the potential on electrode 150. It is, therefore, seen that by controlling the potential difference between electrodes 150 and 152, and assuming the production of a substantially linear sawtooth by the deflection generator 146, any one of an infinite number of hyperbolas may be defined on the surface of the target 130. Consequently, the position information available at terminals 56 of the apparatus shown in FIGURE 1 may be directly applied to the electrodes 150 and 152 to define a single hyperbola on the target 130 of the device in FIGURE 6, the character of the hyperbola being a scaled representation of a hyperbolic line of position arrived at by the analyzer station 30 in FIGURE 1. The points of datum position 136 and 138 in FIGURE 6 will, therefore, correspond to the positions of receiver A and receiver C at 12 and 16 in FIGURE 1. By imposing additional sets of deflecting electrodes in the device shown in FIGURE 6, a second set of hyperbolas of course may be generated. Such generation may be conveniently controlled by the position information delivered across terminals 76 of analyzer station 72 corresponding to hyperbolic lines of position lying between receiver stations B and C at 14 and 16 respectively in FIGURE 1. The intersection of two such lines of position on the surface of the target 130 will of course correspond to a scaled representation of the position of aircraft 10 in FIGURE 1, assuming of course that the relative distances and orientation between points of datum position on the target 130 of the device in FIGURE 6 correspond to the physical separation and orientation of the radio receiver stations shown in FIGURE 1.

In a preferred form of the present invention, three display devices of the general character illustrated at 131 in FIGURE 6 may be employed to produce a composite image depicting three intersecting sets of hyperbolic lines of position. Such an arrangement is illustrated in FIGURE 7. Here, three display devices, which may be of the character of the device 131 shown in FIGURE 6, are shown at 166, 168 and 170. The images produced on the targets of each of these display devices are optically combined by means such as a semi-silvered mirror system or other suitable device indicated at 172. A television camera or other suitable image transducing means may then be positioned as indicated at 174, with its image pick-up element 176 directed toward the mirror 172 so as to respond to the composite image produced by the display devices 166, 168 and 170. Each of the display devices 166, 168 and 170 has applied to it a data signal defining one of a correspondingly different set of three intersecting lines of position. These sources of data signals are indicated at 178, 180 and 182. For ease in illustrating the operation of this particular aspect of the present invention, the data signal sources 178, 180 and 182 have been indicated as representing the output terminals 56, 76 and 78 of the position analyzing apparatus shown in FIGURE 1. Thus, there will be defined on the target of each display device an image bearing a scaled relation to one hyperbolic line of position, the intersection of which, with other lines of positions provided by the associated display devices, define a point of position corresponding to the position of the aircraft 10 in FIGURE 1.

In practice, it is convenient to provide three display devices such as 166, 168 and 170 which are identical in construction, it being also understood that only two of such devices will provide point position information as shown by the discussion of FIGURE 3. Since, as a practical matter, the distances between receiving stations A, B and C shown in FIGURE 1 may not always be equal, the present invention contemplates modifying the images produced by the display devices by optical size adjusting means. Optical size adjusters 184, 186 and 188 in FIGURE 7 provide means for accomplishing this function. The optical size adjusters may comprise conventional arrays of enlarging and reducing lens systems. Transverse deflection signals for each of the display devices 166, 168 and 170 may be provided by a common deflection generator 189.

In the arrangement shown in FIGURE 7, care should be taken to orient each of the display devices 166, 168 and 170 about their axes so that the datum points of position on the target of each (such as points 136 and 138 in FIGURE 6) will conform to the relative positions and relative orientation of receivers A, B and C shown in FIGURE 1. The optical size adjusters 184, 186 and 188 will, after orientation of the display devices 166, 168 and 170 and proper size adjustment by means of the optical size adjusters, make possible a precision scaled representation of the radio receiver locations shown in FIGURE 1. The television camera 174 will, therefore, effectively look at a composite image comprising three sets of intersecting hyperbolic lines of position.

The television signal delivered by camera 174 in FIGURE 7 is then, according to the present invention, amplified by video amplifier 190 and, in one form of the invention, caused to pass through a gamma amplifier 192 to conventional video and deflection signal apparatus at 194. The output signals from the apparatus at 194 are then caused to drive a kinescope 196 which will normally display on its target 198 an image corresponding to the composite image produced by the display devices 166, 168 and 170 in combination with mirror 172. A timing generator indicated at 200, which may be nothing more than a conventional television sync generator and controls both the television camera 174 and the deflection action of the electron beam in kinescope 196, may be in turn synchronized by signals from the deflection generator 189. Such facility is indicated by the switch 202.

In the preferred form of the present invention as carried out in accordance with the showing of FIGURE 7, a novel display technique may be advantageously employed. The gamma amplifier 192 shown in FIGURE 7 may be constructed to establish a threshold in the overall video signal processing channel so that only video signals having amplitudes falling within a predetermined range (and therefore representing a predetermined image brightness range) will be passed on to the video and deflection signal apparatus 194. By this means the image displayed on the target of the kinescope 198 may be caused to represent only the actual intersection of the intersecting lines of position defined by the display devices 166, 168 and 170. In other words, the threshold which may be established by the gamma amplifier 192 permits an intensity selective analysis of the composite image produced by the display devices 166, 168 and 170 and effectuates a point display on the kinescope target 198 which represents only the point in the composite image at which intersecting lines of position coincide. The television camera and associated signal processing elements, therefore, acts as one form of transducer which transduces position information defined by the intersection of lines of position generated in one coordinate system (specifically a hyperbolic coordinate system shown in FIGURE 2) into a point display in another coordinate system (specifically a rectangular coordinate system) on the target 198 of the kinescope 196 in FIGURE 7. The target 198 of the kinescope 196 in FIGURE 7, therefore, comprises a display area which bears a determinable scaled relation to the terrain over which the aircraft 10 (in FIGURE 1) is positioned. This display area provided by the target 198 may be viewed directly or optically projected by means of a lens system 206 onto a presentation area or target 208 on which may be defined details of the terrain over which the aircraft 10 in FIGURE 1 is positioned. By way of example, the outline of a body of land 210 has been illustrated in this connection. A point position display 212 on the target 198 will, of course, be imaged as a point such as point 214 on the terrain map. The presentation target 208 may, of course, be either translucent or opaque, as well as the delineation 210 of terrain features. On the other hand, the presentation target as a whole may simply comprise a map which is fastened on a wall or other supporting structure and toward which light from the kinescope 196 is directed through the lens system 206 in a manner conforming to a given scale.

It will be apparent, upon considering the operation of the image display device 131 shown in FIGURE 6, as employed in the system of FIGURE 7, that if the beam responsive material on the target 130 is a conventional electron beam responsive phosphor such as is used in television kinescopes, oscillographs and the like, the intensity of the images produced on the target will vary from point to point along those hyperbola having considerable curvature. That is to say, most electron beam responsive phosphors are of a type which produce an image the intensity of which is a joint function of beam current intensity as well as the time during which the beam is allowed to act on a given unit area of the phosphor material. This time is of course a direct function of the actual linear velocity of the beam upon and along the surface of the target. Thus, if the beam velocity upon and along the target increases, the intensity of the image produced on the target, for a given beam current intensity, will decrease. If the beam velocity upon and along the target decreases, for a given intensity of electron beam, the brightness will increase In the intensity selective image transducing system shown in FIGURE 7, this characteristic of known phosphors suitable for use as an electron beam responsive target might produce objectionable variations in image intensity. These objectionable variations may be of a magnitude which will interfere with the accurate sensing of intersecting lines of position at points along these lines especially at points where there exists considerable image curvature.

The present invention, therefore, contemplates novel means for correcting such effects resulting from this propensity of known phosphors. In one form of the present invention, advantage is taken of the fact that the light versus excitation characteristic of a given phosphor is generally non-linear, permitting the phosphor to become saturated by the electron beam. The present invention, therefore, contemplates adjusting the intensity of the electron beam in the display device shown in FIGURE 6 so that for the highest beam velocity upon and along the target 130, the material comprising the target 130 is excited into a saturated condition. Alternatively, where target phosphor saturation is not employed, the present invention contemplates the use of a variable gradient filter assembly 231 of the general character illustrated in FIGURE 9. This filter 231 essentially represents what may be considered to be the photographic negative of the unwanted intensity variations produced upon the target 130 of the device in FIGURE 6, as the control voltages applied to the line electrodes 150 and 152 are varied in a continuous manner to delineate a substantially infinite number of hyperbolic lines or curves. The nature of the variable gradient filter 231 will perhaps be more clearly understood by reference to an illustration of the curves shown on the target of the device 131 in FIGURE 6 when projected upon a plane substantially parallel to the target 130. Such an illustration is shown in FIGURE 8.

Figure 12:
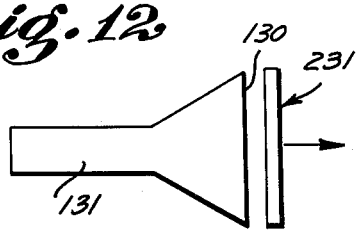
FIGURE 12 is a diagrammatic representation of the operative relationship between the variable gradient filter of FIGURE 9 and an image producing device of the type shown in FIGURE 6.

For ease in understanding, this view of the target 130 in FIGURE 8 has indicated thereon the imaginary points of position 136 and 138 along with the straight line hyperbola 148 and curved hyperbolas 162 and 164. In the light of the above discussion, it will be understood that the velocity of the electron beam producing the curve 164 at point 218 thereon will be substantially greater than the velocity of the beam at point 220 thereon. Likewise, the velocity of the electron beam when depicting point 222 along curve 224 will be greater than the velocity of the electron beam at point 218 on curve 164. Thus, the intensity of the image representing the curves shown in FIGURE 8 will be uniform along line 148 (having no curvature), less intense at point 218, and even less intense at point 222. By exposing a sheet of photographic film, for example, to the target 130 and causing the beam to deflect along a complete set of hyperbolic curves (as is possible, as aforementioned, by continuously varying the control potential applied across line electrodes 150 and 152 of the device in FIGURE 6), the developed photographic film will be substantially as shown at 216 in FIGURE 9. In the central area 226, the density or opacity of the negative will be greater than in the peripheral areas 228, and the gradient of opacity change will complement the undesired changes in the intensity of the images produced on the target of the display device. By mounting the photographic negative in a supporting ring 230, there will result a variable gradient filter assembly 231 which may be imposed, when properly registered, in front of the target of the display device in FIGURE 6 as an intensity corrective. This is illustrated in FIGURE 12 where the display device 131 of FIGURE 6 has its target 130 in registered juxtaposition with the filter 231. A corrective filter 231, when used in the arrangement of FIGURE 7, will therefore be effectively interposed between each of the display devices 166, 168 and 170 and the corresponding optical size adjusters 184, 186 and 188. This novel technique, embraced by the present invention, of course has application to other display apparatus where predictable systematic variations in the intensity of an image depicting a predetermined and known set of curves or images is to be generated and displayed.

Figure 10:
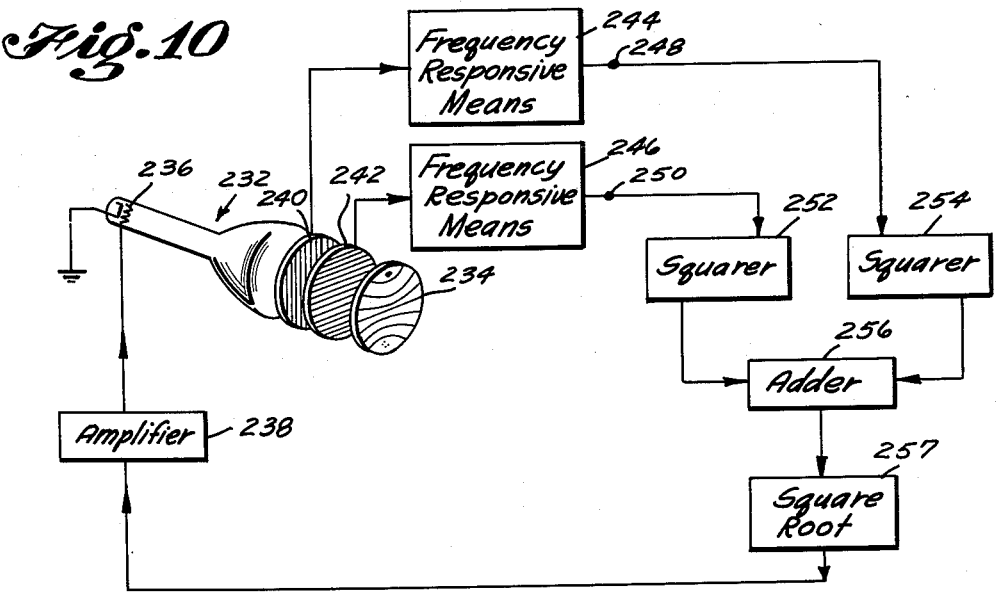
FIGURE 10 is a combination block and diagrammatic representation of one form of the present invention which provides for modifying the intensity of a beam formed image depicting a curve or line of position in accordance with the effective velocity of the beam at various points along the curve.

An alternative arrangement for correcting variations in image intensity attributable to changes in the effective velocity of an electron beam upon and along a beam responsive target as discussed above is illustrated in FIGURE 10. Here, a modified version of the display device 131 is indicated. The display device 232 in FIGURE 10 contains an electron gun assembly and beam deflection means which may be considered identical to the arrangement shown in FIGURE 6 so that the electron beam (not indicated) in the device 232 will define on a phosphorescent target 234 a plurality of curves or traces corresponding to hyperbolas. Although in FIGURE 6 it is assumed that the current intensity of the electron beam produced by the gun structure is constant, in the arrangement of FIGURE 10 a control grid 236 is indicated as means for controlling the current intensity of the electron beam during its deflection. This is accomplished by applying a signal to the control grid 236 from the output of an amplifier 238. In accordance with the present invention, the signal applied to the amplifier 238 is made to represent, at all times during the deflection of the electron beam, the velocity of beam deflection as would be measured upon and along the target 234. In accordance with the present invention, an indication of beam velocity is developed by means of two sensing grids 240 and 242. Each of these grids comprises a plurality of parallel spaced conductors electrically connected to one another. The two sensing grids 240 and 242, therefore, intercept the electron beam in its path to the target 234. In a preferred embodiment of the present invention, the two sensing grids 240 and 242 are oriented at 90 degrees with respect to one another so that the conductive elements of grid 240 lie along lines substantially at right angles to the conductive elements comprising the grid 242. Frequency responsive means 244 and 246 respond to the electrical impulses produced on the sensing grids by virtue of the electron beam sweeping across them, to develop at their output terminals 248 and 250 electrical signals the amplitude of which respectively represent quadrature components of beam velocity. These velocity indicating signals are respectively applied to means indicated at 252 and 254 for squaring the magnitudes of the velocity indicating signals. The signals appearing at the output of the squarer elements 252 and 254 are added by the adder 256 to develop at the output of the adder an electrical signal whose magnitude represents the sum of the squared quadrature velocity components of the electron beam. This signal is in turn applied to a square root circuit 257 which operates upon the signal delivered by the adder to obtain an output signal representing the square root of the sum of the squared beam velocity components. It is this signal which is applied to the amplifier 238 which in turn controls the current intensity of the electron beam as a function of beam velocity. Thus, as the linear velocity of the electron beam upon and along the target 234 increases, which ordinarily will decrease the intensity of the resulting image, the output signal from the amplifier 238 swings the control electrode 236 of tube 232 in a positive going direction to increase the intensity of the image. It will be understood that the control voltage delivered by the amplifier 238 could also produce control of beam current intensity by other means such as modifying the electron beam acceleration potential (not shown) conventionally applied to the cathode ray tube type device 232. For purposes of illustrational simplicity, details of conventional beam accelerating potential supply and its application to effectuate beam acceleration has been omitted from the drawing. Likewise, it will be understood that the tube 232 and especially the elements 234, 240 and 242 are shown in an exploded relationship to one another and that in practice the sensing grids 240 and 242 as well as the electron gun side of the target 234 would be subject to an evacuated atmosphere within the envelope of the display device.

Figure 11:
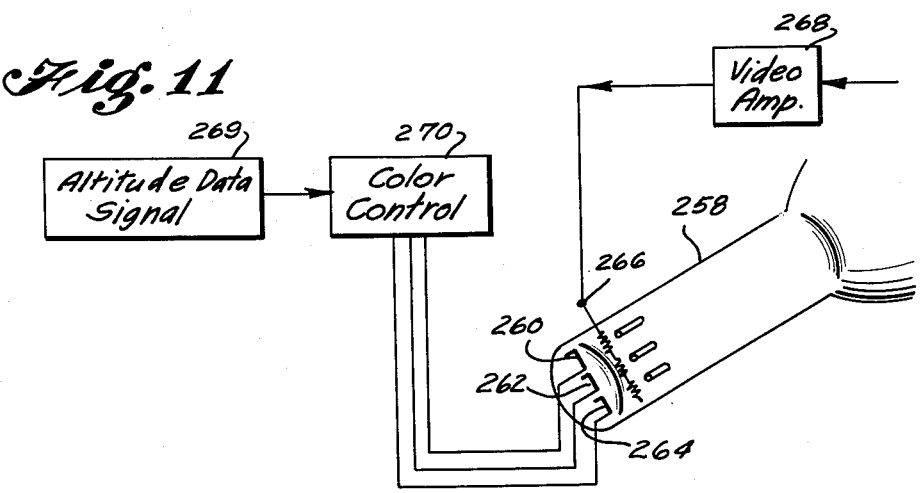
FIGURE 11 is a combination block and diagrammatic representation of one form of the present invention in which position display indicia are controlled in their visible color in accordance with signal intelligence which, by way of example, comprises altitude information associated with the altitude of aircraft or other targets.

It is further contemplated by the present invention that the effective color of the indicia representing a given point of position may be caused to change in accordance with other information such as, for example, the altitude of the aircraft 10 (FIGURE 1) above the earth's surface or other reference plane. To realize this object, the kinescope 196 of FIGURE 7 may be conveniently replaced by a display device in which the color of target excitation produced by the electron beam may be controlled. A variety of such cathode ray display devices are known in the art. One particular type of display device suitable for use in this application would be the RCA shadowmask tricolor kinescope presently used in home color television receivers. This type of cathode ray display tube is generally indicated in part at 258 in FIGURE 11. Three electron gun assemblies having cathodes at 260, 262 and 264 are employed with corresponding control grids connected with one another to a common control terminal at 266. Video signal from a video amplifier 268 is applied to the control electrodes connected with terminal 266. The video amplifier 268 may represent the video signal amplification and output stages of the block element 194 in FIGURE 7. As is well known, each of the electron gun assemblies having cathodes 260, 262 and 264 respectively excite three different types of phosphor deposited on the target of the tube in small dots, each phosphor producing a substantially different primary color such as red, green or blue. A mask or grating interposed between the electron gun assemblies and the target (not shown) effectively masks or protects all phosphor dots of a given primary color from excitation by all but one of the electron guns. By controlling the relative electron beam current intensities produced by the individual guns, the color caused to be displayed on the target of the tube may be controlled over a wide range.

In accordance with the present invention, electrical signal information such as altitude data provided by means indicated at 269 is applied to a color control circuit 270 which controls the relative current intensities of the electron beams produced by the three electron guns. The particular colors produced for a given altitude data signal are not important. The color control circuit 270 may be constructed to produce a variety of input signal-color presentation display relationships. As shown in FIGURE 7, the projected image developed on the target of the cathode ray tube will, if color is controlled as a function of altitude, cause the projection of data position information such as 214 (FIGURE 7) which not only depicts a scaled representation of the position of an aircraft or other object but whose color depicts the altitude of the aircraft above the earth's surface or other reference plane.

The novel features of the apparatus and techniques described above, taken either singly or in combination as set forth in the following claims, provide for improvements in apparatus and systems for handling, processing and transducing electrical signal information into useful visible displays for a variety of purposes. Therefore, the above description, although purposely couched in terms of position data display for purposes of ease in understanding certain characteristics of the present invention, is not meant in any way to preclude the clear value of many aspects of the present invention in connection with systems, apparatus and processes involving signal information other than that representing position information.

I claim:

1. In a display apparatus, the combination of: means for presenting two sets of hyperbolic lines of position effectively superimposed upon one another within a given display area with each set of hyperbolic lines of position being based upon two pairs of fixed datum positions in said given display area; means for effectively actuating one of said lines of position in each set on a selective basis in accordance with data defining the position of a point in a given datum area separate from said display area so that the intersection of the actuated lines of position define in said display area a scaled representation of said point of position in said datum area; and means for sensing in said display area the point at which said actuated lines of position intersect to produce an optical display in said display area at said point of intersection.

2. In a display apparatus, the combination of: a display area having associated therewith means for defining one each of two sets of intersecting hyperbolic lines of position so that the intersection of said two hyperbolic lines of position defines a point of position; and means for transducing only said point of position into a visible display whereby said point of position may be visibly detected.

3. In a position display apparatus for delineating a point of position with respect to at least three fixed datum points together determining at least two pairs of fixed datum points, the distance between fixed datum points in each pair being known, with each pair further defining a set of hyperbolic lines of position determined by the spacing of the fixed datum points comprising each pair, each hyperbolic line of each set depicting a given value of "distance-difference" between a related pair of fixed datum points whereby any one of said hyperbolic lines represents the locus of all possible points of position, the difference in the distance of each of said possible points of position from said two fixed datum points comprising said related pair being a constant equal to a given "distance-difference" value, the combination of: a first datum signal developing means delivering a datum signal having a value representing the value of "distance-difference" of a first point of position with respect to the fixed datum points defining one of said two pairs; a second datum signal developing means for delivering a datum signal having a value representing the value of "distance-difference" of said first point of position with respect to the fixed datum points defining the other of said two pairs; a first grid comprising a plurality of spaced apart electrical conductors insulated from one another and covering a given display area, each conductor being so conformed as to depict a different one of a set of hyperbolic lines of position based upon a first pair of fixed display points in said display area, said pair of display points being spaced apart by a known distance in said display area bearing a given scaled relation to the known distance between the fixed datum points comprising one of the two pairs of fixed datum points; a second grid comprising a plurality of spaced apart electrical conductors insulated from one another and covering said same given display area, each conductor being so conformed as to depict a different one of a set of hyperbolic lines of position based upon a second pair of fixed display points in said display area, said second pair of display points being spaced apart by a known distance in said display area bearing said given scaled relation to the known distance between the other of said two pairs of fixed datum points, and oriented with respect to one another in the same fashion as said two pairs of fixed datum points; means responsive to the values of said first and second datum signals to respectively excite on a selective basis one conductor in each grid such that a point on said display area corresponding to the effective projected intersection of the two excited conductors upon said area defines a second point of position on said display area bearing a relation to said fixed display points which is a scaled representation of said first point of position with respect to said fixed datum points; and means for transducing said point into an optical display.

4. A position display device comprising, in combination: two separate sets of spaced electrically conductive elements, each set substantially covering a given display stage and electrically insulated from one another, the individual elements of each set depicting one of a plurality of spaced lines of position, the lines of position comprising each set being so conformed as to result in nonlinear spacing between the elements of each set so that the number of spaced lines crossing through a unit area of said display stage is a function of the position at which said unit area is taken within said display stage, to result in some unit areas having relatively high line density crossings and some unit areas having relatively low line density crossings, said first and second sets of conductive elements being further so oriented with respect to one another that when projected upon said display stage, selected unit areas of relatively high line density are effectively superimposed upon one another; selective means for electrically exciting one conductive element in each selected unit area respectively in accordance with two position representative signals such that an electrical potential is established between an element in said first set and an element in said second set which when projected on said display stage define, by intersection, a point of position; a plurality of two-terminal electrically responsive annunciator means, each having one terminal coupled with a plurality of said conductive elements defining high line densities in one set and another terminal connected with a plurality of conductive elements defining high line densities in the other set, the connection of said annunciator means having imposed between them and their connections to said line unilaterally conductive means preventing current flow from one set of conductors to another set of conductors whereby a given annunciator is activated upon the common excitation of any one of a first group of conductors in said first set and any one of said conductors falling in said second set whereby annunciation of an approximate point of position is substantially the same for a plurality of different points of position on said display area.

5. Apparatus for displaying in a scaled representation area a point of position, the location of which bears a scaled coordinate relationship to a datum point of position in a datum area, the combination of: means for developing at least a first and a second electrical signal defining intersecting lines of position in said datum area passing through and intersecting at said datum point of position; a first and a second image developing devices for generating images corresponding to a scaled reproduction of said lines of position taken in said datum area, said devices being responsive to electrical signal information to define selected numbers of different sets of possible lines of position; means applying said electrical signals to said first and second devices to produce on each an image corresponding to a scaled representation of one of said intersecting lines of position defining said point in said datum area; means for effectively combining said images to form a composite image of intersecting lines of position defining said point of position; means for separately controlling the relative size of each image to confrom to a predetermined scaled representation of said point of position; and means for transducing only said point of position into a visible display.

6. In a position display apparatus for displaying point position data defined by the intersection of two lines of position, the combination of: means for developing a composite image representing two intersecting hyperbolic lines of position based upon a first coordinate system, the intersection of said lines of position determining a point of fixed position; means responsive to said composite image for systematically scanning said image in accordance with a different type of coordinate system to develop electrical signals representing said intersecting lines of position; and means responsive to said electrical signals for developing a visible display depicting only the point of position, in accordance with the coordinate system of said scanning means.

7. A position display system comprising, in combination: means for delivering a first and a second data signal each representing a different one of two intersecting lines of position, each line of position falling in a different set of possible lines of position forming a coordinate system in a reference stage upon which the development of said data signals is conditioned, the distance between known points in said reference stage being known and the intersection of said lines of position defining a point of position in said reference stage; means responsive to said data signals for developing first and second images depicting scaled representations of said intersecting lines of position within a display stage of known dimensions; means for scanning said display stage with image transducing apparatus for transducing only the intersection of said scaled lines of position into position signals based upon a different coordinate system; and means for transducing said position signals into a visible display which may be optically superimposed upon a presentation stage dimensioned in fixed scaled relation to known points in said reference stage, said position signal transducing means including means for imposing an effective scale modifying action upon said position signals which conforms the scale of visible display to the scale relationship between known points in said presentation stage and corresponding points in said reference stage.

8. In a position display apparatus for displaying point position data defined by the intersection of two hyperbolic lines of position, the combination of: means for developing electrical signal data defining one of said hyperbolic lines of position; means for developing electrical signal data defining the other of said hyperbolic lines of position; means responsive to said first signal data for developing a first display image of one of said lines of position; means responsive to said second signal data for developing a second display image of the other of said lines of position; means for superimposing said first and second display images upon one another to form a composite display, said images intersecting at a point of position having an image intensity representing a substantial variation from the intensities of said first and second display images; and means responsive to variations in intensities of various portions of said composite display image for detecting said point of intersection to develop point position data capable of being transduced into a visible display of point position.

9. A position display apparatus comprising in combination: means for producing an image depicting the first of two intersecting hyperbolic lines of position defining the location of a desired point of position, said image having a predetermined intensity; means for producing another image depicting the second of said two intersecting hyperbolic lines of position which, by cooperative intersection with said first line of position defines the discrete location of said desired point of position, said image of said second line of position also having a predetermined intensity; means for effectively superimposing the images of said first and second lines of position upon one another to form a composite image representing said first and second intersecting lines of position so that the intersection of said lines of position defines said desired point of position as an effective discontinuity in the intensity of each of the images depicting said lines of position whereby said point of position has an intensity substantially differing from the intensity of either of said images depicting said lines of position; and image transducing means responsive to said composite image on an intensity selective basis for transducing into a visible display only those portions of said composite image having an intensity corresponding to said intensity discontinuity at said desired point of position.

10. A position display apparatus comprising, in combination: means for producing an image depicting a first hyperbolic line of position defining in part the location of a desired point of position, said image having a predetermined intensity; means for producing another image depicting a second hyperbolic line of position which, by cooperative intersection with said first line of position defines the discrete location of said desired point of position, said image of said second line of position having a predetermined intensity; means for superimposing said first and second images upon one another to form a composite image comprising said first and second lines of position so intersecting one another as to define said desired point of position as an image having an intensity greater than the intensity of either of said images depicting said first and second lines of position; and image transducing means responsive to said composite image on an intensity selective basis for transducing said image into a visible point display excluding representations of all but the intersecting portions of said lines of position.

11. Display apparatus comprising, in combination: means for producing a first image having a predetermined intensity; means for producing a second image having a predetermined intensity; means for effectively superimposing said first and second images upon one another to form a composite image having intensity variations therein substantially differing from either said first or said second images; television scanning and display apparatus responsive to said composite image for transducing said composite image into a television display; and means included in said television apparatus for establishing an electrical threshold therein discriminating against the television display of all composite image intensities except those representing intensity variations differing from said first or second images taken independently from one another.

12. In a position display apparatus for displaying a point of position upon a map or the like, comprising in combination: means for developing an image representing two intersecting lines of position, the intersection of said lines of position defining a scaled representation of the point it is desired to define on said map; television scanning and display apparatus responsive to said composite image for transducing only said point into a visible television display; and means projecting said composite image as transduced by said television system upon said map in scaled relationship thereto.

13. Apparatus according to claim 12 wherein said television system includes means for establishing electrical threshold therein for discriminating against all composite image intensities other than those corresponding to the intersection of said lines of position whereby the image produced by said television system and projected upon said map represents substantially only the intersection of said lines of position as represented in said composite image.

14. Apparatus for displaying a point of position upon a terrain map which bears a scaled relation to a point of position upon and related to the terrain which said map represents, comprising in combination: means for developing a first and a second datum signals representing two hyperbolic lines of position defined on said terrain each with respect to two datum positions on said terrain and each intersecting the other at a given point of position in relation to said terrain; a first and a second image developing means each comprising in combination an electron beam responsive target for producing an image in response to excitation by an electron beam impinging upon said target, an electron gun directed toward said target for generating and directing a deflectable electron beam impinging upon said target, said target having defined thereon two points of position bearing a scaled relation to said datum positions on said terrain, and means responsive to a datum signal for deflecting said electron beam along selected hyperbolic lines of position based upon said two fixed points on the surface of said target; means for applying said datum signals to said first and second image developing devices respectively to define discrete hyperbolic lines of position on the targets of each; means for effectively superimposing the images produced by said image developing devices in scaled relation to the hyperbolic lines of position defined upon said terrain whereby the intersection of said hyperbolic lines of position produced by said devices defines a point of position bearing a scaled relation to said given point of position on said terrain; and means for imaging the intersection of said hyperbolic lines of position in said composite image upon a map bearing a scaled relation to the terrain.

15. A position display system comprising, in combination: means for delivering first and second data signals each representing a different one of two intersecting lines of position which define by their intersection a point of position in a given reference stage of given dimensions; means responsive to said data signals for developing first and second visible images depicting scaled representations of said intersecting lines of position on a display area of known dimensions; means including optical projection apparatus for projecting said visible images upon a presentation stage dimensioned in fixed scaled relation to said given reference stage, said projecting means including means for effectuating a given size adjustment upon said visible images to maintain the same scale relation between said lines of position and the projected visible images as maintains between the dimensions of said reference stage and said presentation stage.

16. Display apparatus comprising in combination: means for producing a first image having a predetermined intensity; means for producing a second image having a predetermined intensity; means for effectively superimposing said first and second images upon one another to form a composite image having intensity variations therein substantially differing from either said first or said second images; and image transducing means responsive to said composite image on an intensity selective basis for transducing into a visible display only those portions of said composite image having said intensity variations to the relative exclusion of intensity variations in said first or said second images taken apart from one another.

17. A cathode ray display apparatus for displaying position information based upon hyperbolic lines of position, comprising in combination: an electron beam responsive target for producing an image in response to excitation by an electron beam impinging upon said target and deflected along and upon the surface of said target; means comprising an electron gun directed towards said target for generating and directing a deflectable electron beam for impinging upon said target; means for developing a datum signal representing a hyperbolic line of position passing through a given point of position in a datum area, said hyperbolic line of position being based upon two points of datum position in said datum area; means for deflecting said electron beam so that said beam tends to traverse said target along paths substantially perpendicular to an imaginary line on the surface of said target which connects two given fixed points of position on said target, said fixed points of position on said target bearing a distance of separation bearing a scaled relation to said two points of datum position in said datum area; and means responsive to said datum signal for controllably influencing said electron beam during said perpendicular deflection toward and away from either of said points of position on said target to define a hyperbola based upon said fixed points of position on said target, but bearing a scaled relation to said hyperbolic line of position passing through said given point of position in said datum area.

18. In position display apparatus, the combination of: means for developing a first and a second electrical signal representing a pair of curved intersecting lines of position, each curved line of position being a respective member of one of two separate sets of curved hyperbolic lines of position serving as a coordinate system for a reference area of given dimensions; means for defining a display area dimensioned in accordance with a given scaled relation to said reference area; means responsive to electrical signals for selectively defining regularly spaced points of illumination throughout said display area in the form of rows and columns to provide a rectangular coordinate system of position display within said display area; and means actuating said last-named means in response to said electrical signals to produce a point of illumination at a position in said display area which generally agrees with the point of intersection of said two curved hyperbolic lines of position if represented within said display area in accordance with said given scale.

19. In a position display apparatus, the combination of: means developing electrical signal information representing the position of a point within a given reference area in terms of the intersection of two curved lines of position, each line of position being a respective member of two separate sets of curved hyperbolic lines of position serving a reference area of given dimensions as a coordinate system; means defining a display area dimensioned in accordance with a given scale relation to said reference area; means associated with said display area for defining therein a rectangular coordinate system of position display whereby a point of position within said display area may be visibly indicated as a point of illumination; and means controlling said last-named means in accordance with said electrical signal information to produce points of illumination at positions in said display area which generally agree with the points of intersection between said two separate sets of curved hyperbolic lines of position if represented within said display area in accordance with said given scale.

References Cited in the file of this patent

UNITED STATES PATENTS

| | | |
|---|---|---|
| 2,267,715 | Bowen | Dec. 30, 1941 |
| 2,307,029 | Elm | Jan. 5, 1943 |
| 2,399,671 | Gage | May 7, 1946 |
| 2,422,100 | Huff | June 19, 1947 |
| 2,427,220 | Luck | Sept. 9, 1947 |
| 2,480,152 | Mandel | Aug. 30, 1949 |
| 2,691,116 | Allwine | Oct. 5, 1954 |
| 2,739,264 | Shreeve et al. | Mar. 20, 1956 |
| 2,750,534 | Anderson | June 12, 1956 |
| 2,801,355 | Nunan | July 30, 1957 |
| 2,827,822 | Timms | Mar. 25, 1958 |
| 2,844,811 | Burkhart | July 22, 1958 |
| 2,920,320 | Ross | Jan. 5, 1960 |
| 2,961,485 | Hentschel | Nov. 22, 1960 |
| 2,979,713 | Fleming-Williams | Apr. 11, 1961 |

FOREIGN PATENTS

| | | |
|---|---|---|
| 133,606 | Sweden | Nov. 20, 1951 |
| 488,855 | Canada | Dec. 16, 1952 |

OTHER REFERENCES

"Teleran," R.C.A. Review, December 1946, pp. 601–621.